June 7, 1927.                    1,631,296
F. A. SMITH
TIRE CHAIN
Filed May 28, 1925

INVENTOR
Frank A. Smith
BY
ATTORNEY

Patented June 7, 1927.

1,631,296

UNITED STATES PATENT OFFICE.

FRANK A. SMITH, OF UNION CITY, CONNECTICUT.

TIRE CHAIN.

Application filed May 28, 1925. Serial No. 33,545.

This invention relates to a new and improved tire chain for motor vehicles.

It is the object of this invention, among other things, to provide a cross chain for tire chains of this character that will automatically present different portions thereof to the surface over which the motor vehicle is traveling and thereby increase the life of the cross chain, without resorting to the common expedient of disengaging the cross chain from the side chains, then replacing it in a different position so that the same portion of the chain is not again presented to the road surface.

Among other aims and objects of the invention may be recited the provision of a device of the character mentioned that may be readily connected with the side chains, either permanently or in a readily detachable manner; and to provide means whereby the cross chain may rotate about its axis and have no limit as to such rotation or be limited in respect thereto, as may seem desirable.

The improvements in the details and arrangement of parts will be apparent from an inspection of the accompanying drawings, in connection with the description hereinafter contained, wherein a preferred embodiment of the invention is disclosed for the purpose of imparting an understanding of the same.

In the drawings, in which like numerals of reference designate like parts in the several figures.

Figure 1:
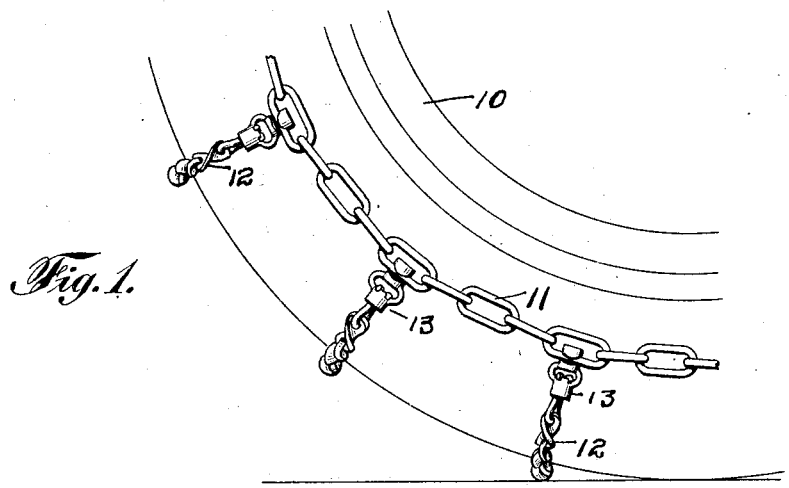
Figure 1 is a side elevation of a portion of a wheel of a motor vehicle with my improved mechanism connected therewith.
Figure 2:
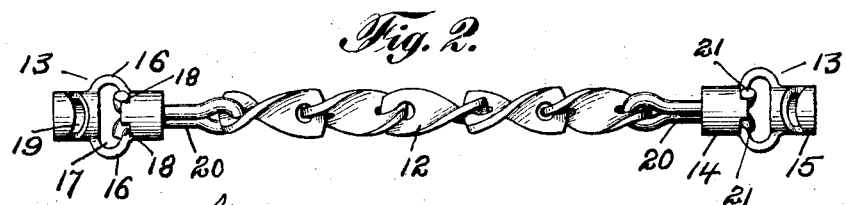
Figure 2 is an enlarged elevation of the cross chain constructed in accordance with my invention.
Figure 3:
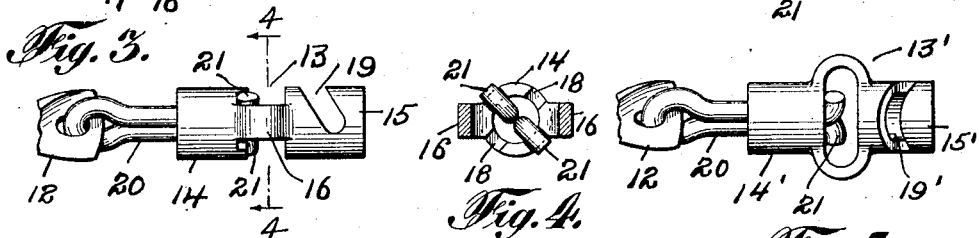
Figure 3 is an enlarged elevation of the coupling, swivel hook and a portion of one of the links.

As is well known, the cross chain of a tire chain is subjected to very severe wear and to extend the life of this cross chain it has been the practice to manually disengage the same from the side chains, reverse its position and reattach it to the side chains, so as to present a new wearing surface. This involves considerable labor, and in practice is so frequently neglected that the cross chains are worn out before it occurs to the motor vehicle operator that their position should be changed.

Frequently, by reason of such neglect these cross chains become so worn as to be practically valueless resulting in the motor vehicle traveling under most adverse conditions with the possibility of an accident therefrom greatly increased.

With my invention I have provided means whereby the cross chains will automatically rotate and continually present new wearing surfaces, thus obviating the necessity of manually changing the position of the cross chain, extending the life thereof and eliminating the present possibility of accident and damage due to the failure to manually reverse the position of the cross chains, as is now the practice.

Referring to the drawings, 10 designates a portion of a wheel felly and 11 one of the side chains thereof, both of which are of the conventional form, the latter being shown as composed of a plurality of open links.

The form of cross chain illustrated consists of a plurality of links 12, shown as solid but may be of the conventional open link form within my invention, if desired.

At each of the opposite ends of the cross chain is a coupling 13, which may be constructed with two substantially hollow cylindrical portions 14 and 15 joined by the tie bars 16 with an open space 17 therebetween.

The inner end of the portion 14 is provided with a plurality of recesses 18 and the portion 15 is provided with an undercut slot 19 which is of substantially the same width as the diameter of the bar forming the links of the side chain 11. Each of the end links 12 is connected with a coupling by a swivel hook 20, preferably but not necessarily made from a wire rod, which projects through the bore of the cylindrical portion 14 with the inner free ends thereof turned outwardly to form the arms 21.

Each of the couplings is secured to a link of a side chain by projecting one of the side bars of a link into the slot 19 and then closing the same thereon by a blow upon the end of the coupling. When assembled the side and cross chains are in substantially the relative positions shown in Figure 1.

These couplings will retain their engagement with the links without closing the ends thereof onto the links, but it seems desirable in some cases and under some conditions that the cross chain be thus permanently secured.

In practice, side chains are never held competely taut but sag considerably and the cross chains on the lower side of the wheel are never taut against the outer surface of the tire. Hence, as the tire rotates and the cross chain approaches the road surface, the under chains sag away from the tire, reaching the maximum sagging just before the cross chain contacts with the road surface. Thus the under cross chain first engages the road surface free from the weight of the tire, and this has a tendency to lift the side chain, slightly owing to the vibration of the car and the swing of the chain etc., so that the arms 21 will be lifted out of the recesses 18 and the cross chain will revolve about its own axis by reason of the friction thereagainst until the weight of the tire and the motor vehicle is sufficient to hold the same against rotation, at which time the arms 21 will again drop by gravity into the recesses 18 and prevent further rotation of the cross chain. Therefore, as the wheel rotates, these cross chains successively rotate about their axes and present new wearing surfaces.

Figures 4, 5:
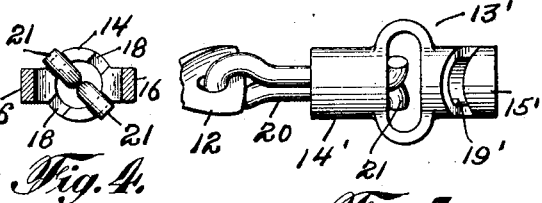
Figure 4 is a transverse sectional view thereof, the parts in section being taken generally upon line 4—4 of Figure 3.
Figure 5 is a plan view of the coupling illustrating a modified form of structure thereof.

In Figure 5 a modified form of coupling 13' is shown, the only difference therein and the coupling 13 being the absence of the recesses 18 so that there is no limit to the extent of rotation of the swivel hook 20 relatively to the coupling.

Figure 6:
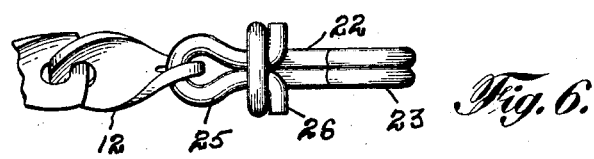
Figures 6 and 7 are a plan view and side elevation respectively of a modified form of coupling and swivel hook.
Figure 7:
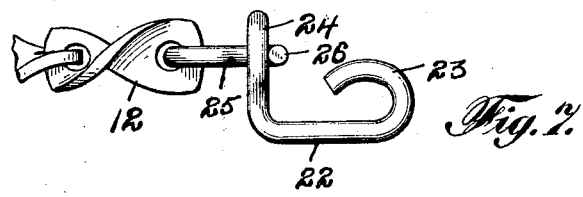

In Figures 6 and 7 I have shown another modified form of coupling which is constructed of wire having a body portion 22, a hook 23 at one end by means of which the coupling is connected with the side chains 11, and an eye portion 24 through which project the swivel hook 25, the arms 26 of which are turned outwardly upon that side of the eye opposite to the links 12.

The foregoing description is directed solely toward the construction illustrated, and I desire it to be understood that I reserve the privilege of resorting to all mechanical changes to which the device is suitable, the invention being defined and limited only by the terms of the appended claims.

What I claim as new and desire to secure by Letters Patent, is:—

1. In a tire chain, the combination with side chains; of cross chains; a coupling at each end of the cross chains, connected with a side chain and having an opening therein; and a connection between the links of the cross chain and the coupling that projects through said opening and terminates in radially projecting arms that engage and are held against movement in one direction by a surface on the coupling adjacent to the opening.

2. In a tire chain, the combination with side chains; of a cross chain; and means for pivotally connecting the cross chain to the side chains and comprising in part a coupling having two substantially hollow cylindrical portions joined by tie bars with an open space therebetween.

3. In a tire chain, the combination with side chains; of a cross chain; means for pivotally connecting the cross chain to the side chains and comprising in part a coupling having two substantially hollow cylindrical portions joined by tie bars with an open space therebetween and having an undercut slot in one of said portions.

4. In a tire chain, the combination with side chains; of a cross chain; and means for pivotally connecting the cross chain to the side chains and comprising in part a coupling having two substantially hollow cylindrical portions joined by integral tie bars with an open space therebetween, each of said tie bars extending laterally outside of the cylindrical portions.

5. A cross chain having a plurality of links, a coupling at each end of the chain; and a connection between the link at each end of the chain and the adjacent coupling capable of rotation relatively thereto, said coupling being formed with two end portions having openings therethrough and an open space therebetween, and into which projects a portion of the said connection.

6. A cross chain having a plurality of links, a coupling at each end of the chain; a connection between the link at each end of the chain and the adjacent coupling capable of rotation relatively thereto, said coupling being formed with two end portions having an open space therebetween the inner end of one of such portions having recesses therein, and into which project radial arms upon the connection.

In testimony whereof, I have hereunto affixed my signature.

FRANK A. SMITH.